May 12, 1942.    E. J. SABOL    2,283,095
RAIL BOND TERMINAL
Filed Sept. 25, 1940

Inventor:
ERNEST J. SABOL,
by: John E. Jackson
His Attorney.

Patented May 12, 1942

2,283,095

UNITED STATES PATENT OFFICE 2,283,095

RAIL BOND TERMINAL

Ernest J. Sabol, Edgewood, Pa.

Application September 25, 1940, Serial No. 358,363

4 Claims. (Cl. 287—20.3)

This invention relates to rail bond terminals and is particularly concerned with signal bond terminals of the type having studs for insertion in the small holes formed in the sides of the heads of railroad rails for this purpose.

Specific examples of the present invention are illustrated in the accompanying drawing, in which.

Figure 1:
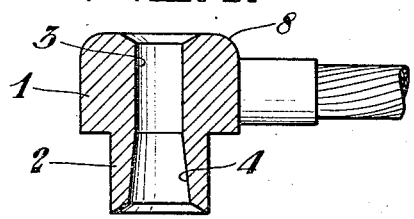
Figure 1 is a longitudinal section of a bond terminal.

More specifically, the drawing shows a terminal plug having a head portion 1 and a stud portion 2 with a bore formed therethrough longitudinally of the stud, the bore having a cylindrical portion 3 inside the head 1 and a flaring portion 4 inside the stud 2. An insert extends through the bore with a cylindrical portion 5 fitting the cylindrical portion 3 of the bore and a flaring portion 6 fitting the flaring portion 4 of the bore. Both the portions 5 and 6 extend beyond the openings of the bore through the terminal head and stud.

In use the insert is pushed into the plug, and the insert and the stud 2 are placed in a hole 7 formed in the side of the head of a railroad rail, this being the standard ¼ inch deep, ⅜ inch diameter hole drilled for this purpose. The projecting end of the cylindrical portion 5 of the insert is then struck with a hammer, the portion 6 being malleable and expanding so as to expand the terminal stud, the extending end of the portion 6 of the insert engaging the bottom of the rail hole and expanding so as to fill the space between the end of the stud 2 and the bottom of the hole. This action is aided by making the portion 5 of harder metal and the portion 6 of softer metal, as, for instance, by making the portion 5 of steel and the portion 6 of copper, the two portions being joined by butt welding or, if desired, used as separate pieces fitted in the portions 3 and 4 of the bore in the terminal.

As will be seen from the drawing, the cylindrical bore suddenly flares outwardly at a line substantially coincident with the line of the shoulder formed by the narrowing of the head portion 1 into the stud portion 2. The juncture between the cylindrical portion 3 of the bore and the outwardly flaring portion 4 defines a stop beyond which the flaring portion of the insert cannot pass. This assures the end portion 6 of the insert projecting properly from the bottom end of the stud 2 so that when the plug is inserted in the hole, the said juncture shoulder between the head and stud is maintained spaced away from the surface of the rail.

This enables the plug to be driven "home" when the terminal is inserted, and assures sufficient space for the driving so as to provide clearance for enough movement of the plug to make it tight.

Additionally, it will be seen from the drawing that the quantity of soft metal in the portion 6 of the insert is proportioned so that when the plug is driven home, the soft metal will be forced tightly into the space between the end of the stud 2 and hole 7 so as to effect the requisite tight fit between the terminal and rail without excessive metal projection from the outer end of the head 1, thus assuring a workmanlike job, as well as reducing the quantity of metal required for the insert. In order to help in preventing such excess of metal extending from the outer end of the inserted terminal, the head 1 preferably is countersunk as shown in the drawing, this providing additionally a seat for the outer end of the hammered-in insert.

The outside of the head 1 opposite the stud 2 has an annular raised portion 8 surrounding the opening to the portion 3 of the bore. This annular raised portion is radially rounded and functions to receive the last one or two hammer blows and transmit their force directly into the wall of the stud 2 so as to assure its being correctly fitted and effect slight lateral expansion thereof by reason of the longitudinal compression resulting from the engagement of the end of the stud with the circumference of the rail hole bottom. In case this effect is not desired, the stud may be designed to terminate short of the rail hole bottom in which case the portion 6 of the insert will expand into engagement with the side wall of the rail hole between the end of the stud and the rail hole bottom. This will produce an interlocking effect, it being shown by Figure 7.

In some instances the hole 7 is inadvertently drilled to an oversized diameter and in such instances many terminals cannot be used with satisfaction. However, in cases where the hole is extremely oversized, a punch 9 may be used to drive the portion 5 of the insert farther into the portion 3 of the bore through the terminal. In this way the stud 2 can be properly expanded to meet holes that are considerably oversized in diameter.

Figure 5:
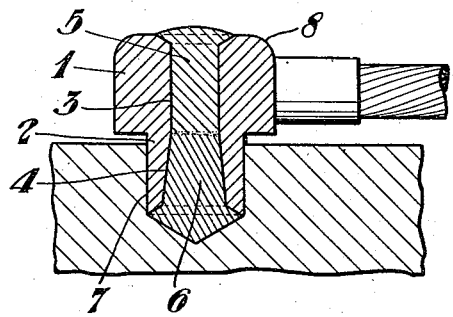
Figure 5 shows the terminal and insert as installed.
Figure 6:
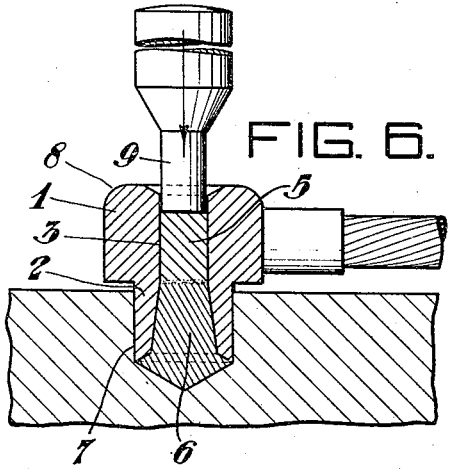
Figure 6 is a modification of what is shown by Figure 4.
Figure 7:
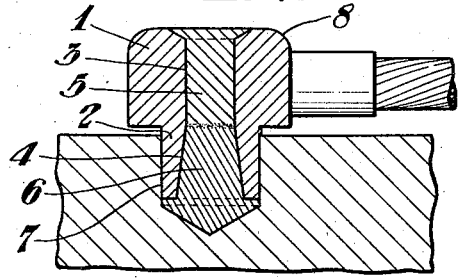
Figure 7 is a modification of Figure 5.

It is to be understood that although the portion 5 of the insert is harder than the portion 6, it is still malleable and subject to deformation. Thus, the portion 5 normally upsets at the terminal head, it filling the space inside the annularly raised portion 8 as shown by Figures 5 and 7. However, due to the portion 5 being harder than the portion 6, the latter tends to upset to the greater degree, the portion 5 acting largely as a force transmitter or tool.

Figure 2:
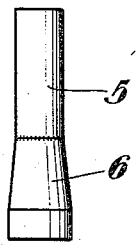
Figure 2 shows an insert used with this terminal.
Figure 3:
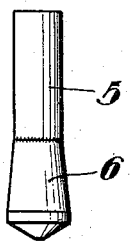
Figure 3 is a modification of Figure 1.
Figure 4:
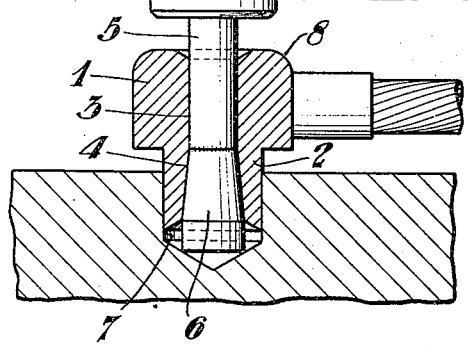
Figure 4 shows the terminal and insert during installation.

In all cases, the portion 3 of the bore is made cylindrical as is the portion 5 of the insert, this meaning there is little expansive effect exerted inside the terminal 1 where it cannot do useful work. The projecting end of the portion 6 of the insert may be flat as shown by Figure 2, or it may be pointed as shown by Figure 3, so as to fit the conical bottom of the usual rail hole.

I claim:

1. A rail bond terminal adapted to be inserted in a bottomed hole in a side of a rail head, the said terminal comprising a plug having a head and a stud with a bore formed therethrough longitudinally of the stud and head, the bore being cylindrical in the head and suddenly flaring outwardly from the head to the end of the stud, and an insert pin adapted to be slipped into the bore, the said pin being sufficiently long to extend through the bore and to project therefrom sufficiently to more than reach the bottom of the hole in the rail when the stud is inserted therein, the pin being provided with a cylindrical portion fitting the cylindrical portion of the bore and a flaring portion fitting the flaring portion of the bore, both portions of the insert extending beyond the openings of the bore, the cylindrical portion of the insert being made of metal harder than the flared portion, the said flared portion being sufficiently soft to upset against the underside of the stud when the terminal is driven into the hole, the said stud being sufficiently malleable to become expanded in the hole into a tight fit with the rail under longitudinal compression transmitted thereto by driving impacts applied to the extending hard portion of the pin as the terminal is driven into the rail, the cylindrical portion of the bore and the flaring portion thereof forming a juncture defining a stop for the pin, whereby the head of the plug is spaced sufficiently far from the rail to enable the plug and pin to be driven into tight engagement with the rail while avoiding extrusion of metal from the pin substantially beyond the said head.

2. A rail bond terminal adapted to be inserted in a bottomed hole in a side of a rail head, the said terminal comprising a plug having a head and a stud, with a bore extending longitudinally entirely through the plug, the said bore being cylindrical in the head and frusto-conical in the stud, an insert pin in the bore having a cylindrical portion corresponding to the cylindrical portion of the bore and a frusto-conical portion corresponding to the frusto-conical portion of the bore, the frusto-conical portion of the pin being softer than the cylindrical portion, the cylindrical portion of the bore and the frusto-conical portion thereof joining to form a seat for the pin, the said pin being longer than the plug so that the softer portion of the pin projects beyond the stud and the harder portion of the pin projects beyond the head, the said softer portion of the pin being adapted to space the head sufficiently far from the rail to enable the plug to be driven into tight contact therewith while the projecting softer portion of the pin upsets between the bottom of the hole and the stud, the projecting softer portion of the pin being proportioned in amount relative to the projecting hard portion of the pin, so that when the plug is driven completely into the hole the softer portion of the metal is compressed tightly therein while avoiding substantial excess of metal from the pin extending from the head of the plug while expanding the said stud tightly against the rail.

3. A rail bond terminal adapted to be inserted in a bottomed hole in a side of a rail head, the said terminal comprising a plug having a head and a stud and having a bore extending longitudinally entirely through the plug, the said bore being substantially cylindrical in the head and outwardly flaring in the stud, and an insert in the bore having a cylindrical portion inserted in the cylindrical portion of the bore and an outwardly flaring portion corresponding to the outwardly flaring portion of the bore, the insert extending beyond the head and the stud, thereby spacing the head of the plug from the rail, the flaring portion of the insert being composed of relatively soft metal and the cylindrical portion being of relatively hard metal, the relatively soft metal being adapted to deform against the bottom of the hole in the rail and to upset against the bottom of the stud when the terminal is hammered into the hole, and being proportioned so as to be adapted to tightly and completely fill the space between the bottom of the hole and the stud under driving impacts while avoiding any substantial amount of metal extending from the head of the plug when complete insertion of the terminal in the hole is effected.

4. A rail bond terminal adapted to be inserted in a bottomed hole in a side of a rail head, the said terminal comprising a plug having a head and a stud, and a bore extending longitudinally entirely through the plug, the said bore being substantially cylindrical in the head and outwardly flaring in the stud, and an insert in the bore having a cylindrical portion inserted in the cylindrical portion of the bore and an outwardly flaring portion inserted in the outwardly flaring portion of the bore, the insert extending beyond the head and the stud, the flaring portion of the insert being composed of relatively soft metal and the cylindrical portion being of relatively hard metal, the relatively soft metal being adapted to deform against the bottom of the hole in the rail and to upset against the bottom of the stud when the terminal is hammered into the hole, the said soft metal expanding the stud in the hole to make a tight fit with the rail responsively to hammering impacts thereon, the said soft metal being proportioned in amount relative to the hard portion of the insert extending from the head of the plug so as to be adapted to tightly and completely fill a space between the bottom of the hole and the bottom of the stud when the plug has been hammered completely into place while avoiding any substantial amount of metal extending from the head of the plug when complete insertion of the terminal in the hole is effected, the head of the plug being countersunk to receive any such excess of metal and to maintain the same substantially flush with the top of the head of the plug.

ERNEST J. SABOL.